US007289316B2

(12) United States Patent
Feret

(10) Patent No.: US 7,289,316 B2
(45) Date of Patent: Oct. 30, 2007

(54) VISUAL SERVING TRAY AND METHOD

(76) Inventor: Philippe Feret, c/o Allure Catering, 1422 Third Ave., New York, NY (US) 10028

(*) Notice: Subject to any disclaimer, the term of this patent is extended or adjusted under 35 U.S.C. 154(b) by 0 days.

(21) Appl. No.: 10/965,367

(22) Filed: Oct. 14, 2004

(65) Prior Publication Data

US 2005/0141178 A1 Jun. 30, 2005

Related U.S. Application Data

(60) Provisional application No. 60/510,987, filed on Oct. 14, 2003.

(51) Int. Cl.
*G06F 1/16* (2006.01)

(52) U.S. Cl. .................. 361/683; 361/724; 340/573.1; 463/25

(58) Field of Classification Search ........ 361/679–687, 361/724–727; 340/573.1; 463/25, 29; 273/309; 705/15, 10
See application file for complete search history.

(56) References Cited

U.S. PATENT DOCUMENTS

| | | | | |
|---|---|---|---|---|
| 4,521,021 | A | 6/1985 | Dixon | 273/148 |
| 4,584,603 | A | 4/1986 | Harrison | 358/86 |
| 4,630,821 | A | 12/1986 | Greenwald | 273/85 |
| 4,756,528 | A | 7/1988 | Umashankar | 273/1 E |
| 5,655,966 | A | 8/1997 | Werdin, Jr. et al. | 463/25 |
| 5,724,482 | A * | 3/1998 | Grewe et al. | 704/501 |
| 6,294,999 | B1 | 9/2001 | Yarin et al. | 340/573.1 |
| 6,367,392 | B2 | 4/2002 | Moore | 108/90 |
| 6,396,506 | B1 | 5/2002 | Hoshino et al. | 345/650 |
| 6,856,505 | B1 * | 2/2005 | Venegas et al. | 361/683 |
| 2001/0039904 | A1 | 11/2001 | Moore | 108/59 |
| 2002/0027507 | A1 | 3/2002 | Yarin et al. | 340/573.1 |
| 2002/0167140 | A1 | 11/2002 | Pike et al. | 280/47.38 |
| 2002/0194072 | A1 * | 12/2002 | Blink et al. | 705/15 |
| 2003/0132612 | A1 | 7/2003 | Pike et al. | 280/642 |
| 2004/0035863 | A1 | 2/2004 | Metcalf et al. | 219/734 |
| 2004/0128887 | A1 | 7/2004 | Herbert et al. | 40/606.08 |
| 2004/0192444 | A1 * | 9/2004 | Morrison | 463/46 |

FOREIGN PATENT DOCUMENTS

| | | | |
|---|---|---|---|
| JP | 406020455 | * | 1/1994 |

* cited by examiner

*Primary Examiner*—Hung Van Duong
(74) *Attorney, Agent, or Firm*—Ostrolenk, Faber, Gerb & Soffen, LLP

(57) ABSTRACT

A portable device includes a tray. The tray includes at least one serving face in which at least a substantial part of the serving face is constructed and arranged to hold at least one item to be carried. The tray carries at least one display monitor such that the monitor is substantially viewable together with the serving face of the tray. An interface is operably connected to the display monitor and is intended to be operably connected to a source such that images, pictorial information, graphical information and/or video can be displayed on the display monitor.

34 Claims, 16 Drawing Sheets

VISUAL SERVING TRAY AND METHOD

RELATED APPLICATIONS

This application is based on and claims priority to U.S. Provisional Application No. 60/510,987, filed on Oct. 14, 2003, by Philippe Feret, entitled, "Marketing Device," the contents of which are hereby incorporated by reference.

BACKGROUND OF THE INVENTION

1. Field of the Invention

The present invention relates to a portable display system and, more particularly, to a portable display system that can both hold items and present visual information.

2. Discussion of the Related Art

Traditionally, trays and platters have been simple functional devices that include a surface on which food is served and items are held. Often, the surface of the tray may include a decorative design to enhance the item presented or to attract one's attention. More recently, mirrors, emanating smoke, and blinking lights have been added to trays to further enhance presentation and attract attention.

While all of these tray variations momentarily attract and catch the eye of one looking at the tray, they do little to hold one's attention. For example, variations like mirrors have been added to the trays of high chairs and strollers to amuse small children. Because these variations are stagnant, however, they fail to provide continued amusement. In addition, the traditional tray variations provide a limited way to enhance presentation, often making it difficult to convey artistic and communicative messages.

BRIEF SUMMARY OF THE INVENTION

Accordingly, it is desirable to provide an enhanced tray that includes an integrated display monitor that can display pictorial and graphical information, such as a series of moving or still images, video, pictorial and/or graphical information thereby overcoming the above and other disadvantages of the prior art. In accordance with an example embodiment of the invention, a display monitor with a screen is carried by a tray such that the screen of the display monitor is flush or coplanar with a front surface/serving service of the tray. As such, the display monitor/screen essentially form part of the serving service of the tray. In this orientation, items may be placed on the tray serving service either around the screen and/or over the screen.

The display monitor is also connected to an electronic information source that provides the pictorial and graphical information. This information is subsequently displayed on the screen. As such, while the tray is being used to hold or present items, a person using the tray and/or others near the tray can simultaneously view the images, pictorial information, graphical information and/or video on the display monitor screen.

In accordance with another example embodiment of the invention, rather than the display monitor and screen being flush with the tray front surface, the display monitor is disposed on, or carried by, the front or serving surface of the tray. For example, the display monitor and the front or serving surface of the tray are substantially flush or substantially coplanar. Here, the display monitor is essentially in a plane parallel to the plane formed by the tray surface. Alternatively, the display monitor can be mounted at an angle to the tray surface or can be mounted on an arm up off of the tray surface.

In a further example of this embodiment, the display monitor may be disposed on, or carried by, the tray at a tray edge so that the monitor is again, in a plane parallel to the tray surface. Alternatively, the display monitor can be mounted at an angle to the tray surface or can be mounted on an arm up off of the tray surface.

In accordance with another example embodiment of the invention, one or more speakers are integrated with the tray and display monitor. The audio source to these speakers may either be the same source driving the display monitor or a different source.

In accordance with another example embodiment of the invention, a camera is integrated with the tray and display monitor. In an example embodiment, the camera directly drives the display monitor. In a second example of this embodiment, the display monitor is switchably connected to both the camera and another electronic information source. As such, through the operation of the switch, the display monitor shows information from either source.

In accordance with another example embodiment of the invention, the tray now includes a second, or any other number of display monitors, each being driven by different sources. The orientation of these monitors can all vary in accordance with any of the embodiments Overall, the information source that drives the display monitors(s) of the above embodiments may be external to the tray and display monitor or integrally connected therewith. When external, the information source may interface the display monitor either through wires or through a wireless interface.

DESCRIPTION OF THE EMBODIMENTS

Figure 1A:
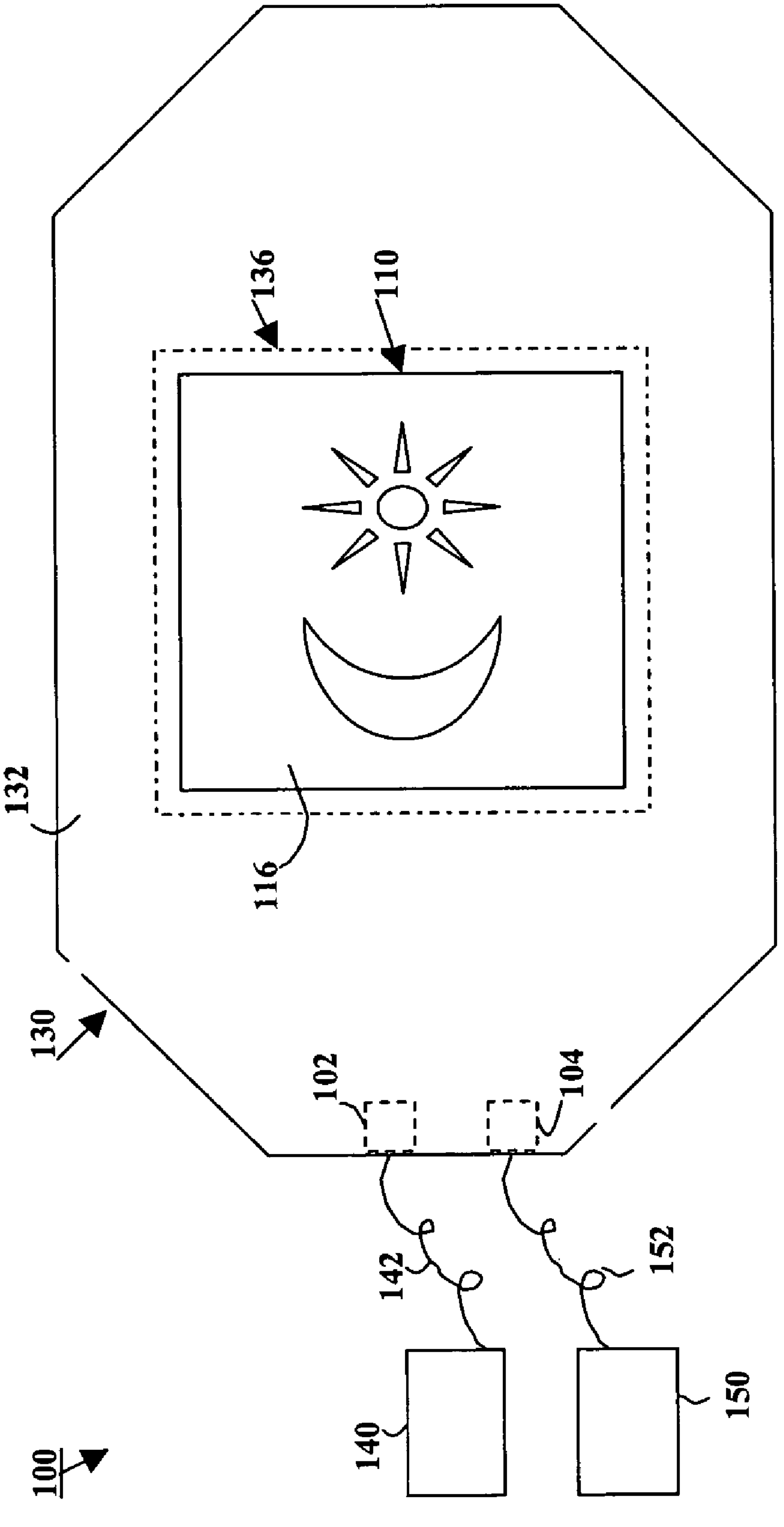
FIG. 1A shows a frontal view of a visual tray in accordance with an example embodiment of the present invention where a display monitor screen is shown carried by the tray front/serving surface in a flush orientation.

In an example embodiment, the present invention is a tray or serving platter with at least one electronic display monitor integrated with the tray. This combination tray and display monitor is portable and is operatively connected to an electronic information source that produces visual information, including but not limited to still or movable images, video, pictorial information and/or graphical information. In accordance with an example embodiment of the invention, a person can use the tray for serving or holding food or other items while the electronic information source simultaneously produces visual information that is displayed on the display monitor. In particular, the electronic information source can be programmed to produce, for example, still or moving images/pictures, movies and other continuous video, video clips, pictorial information, graphical information etc., and combinations thereof. As such, while the tray is being used to hold or serve food or other items, the person using the tray, and/or others near the tray, can simultaneously view images, pictorial information, graphical information and/or video on the display monitor.

FIGS. 1A, 1B, 1C, 1D, 1E, and 1F show an example system 100 in accordance with an example embodiment of the invention. Referring now to FIGS. 1A through 1F, in accordance with this example embodiment, system 100 includes a tray 130 and at least one display monitor 110 with a screen 116 that projects images, pictorial information, graphical information, video and/or the like for viewing. The system 100 can be constructed by any of the known methods with any of the known components and materials. The system further includes at least one composite video input receptacle 102, a power input receptacle 104, an electronic information source 140, and a power source 150.

As is further described below, under this example embodiment, the screen 116 is carried by the front surface of the tray 132 in a flush arrangement, i.e., coplanar with the front surface of the tray 132 and as such, the screen 116 essentially forms part of the front surface 132 and thereby the serving surface from which items can be served or held. As will be realized by those skilled in the art, the screen 116 need not be flush or coplanar with the front surface of the screen, but can for example, be disposed on the front surface 132, or the screen 116 can be substantially coplanar or substantially flush with the front surface 132, etc.

The display monitor 110 includes a rear surface 112 and a front surface 114 on which is disposed the screen 116. The quality of the display monitor 110 (i.e., resolution and dpi (dots per inch)), and the shape (e.g., circle, square) and size (i.e., cross-dimensional measurement) of screen 116 are not specific to the invention. In addition, the display monitor's type is not specific to the invention and may be for example, a LCD (liquid crystal display), or other known display. Nonetheless, the shape, size, and quality of the display monitor and screen should allow a person within several feet of system 100 to easily view the image displayed on the screen 116. At the same time, the shape, size, and quality should be such that the weight of display monitor 110, when combined with tray 130, can be easily carried and/or moved by a person, thereby making the system 100 portable. As an example, the display monitor 110 may be of the following type, available from any of the know suppliers: 4" TFT (Thin Film Transistor) LCD monitor; Resolution: 234×383 dpi; Backlight: cold cathode fluorescent lamp; Power Source: 12 vDC @ 400 mA; Screen Size: 4.1"L×3.3"W×0.7"H; Unit Size: 4.7"L×3.3"W×1.3"H; Weight: 0.7 lbs.

In an example embodiment, the tray 130 includes a rear surface 134, a front/face/serving surface 132 on which items (e.g., food) can be placed, and is made from any material providing somewhat rigid support, including metal, wood, plastic, cardboard, or the like or even various computer punch boards. Overall, the shape and size of tray 130 is not specific to the invention. However, the shape and size of the tray should allow system 100 to be portable.

As indicated, in this embodiment of the invention, the screen 116 is flush or coplanar with the front surface 132 of the tray when the display monitor 110 is integrated with the tray. In general, those skilled in the art will readily recognize that there are many different ways to form tray 130 and attach monitor 110 to achieve this flush orientation without departing from the invention. For example, tray 130 can be formed with a depression in the front surface 132 that is in the shape of the display monitor and has the same depth as the display monitor. The display monitor can then be inserted into this depression such that the rear surface 112 of the monitor is downward against the tray and the screen 116 is upward. In this fashion, the screen 116 is viewable from the front surface 132 of the tray and is also flush with this surface.

Figure 1B:
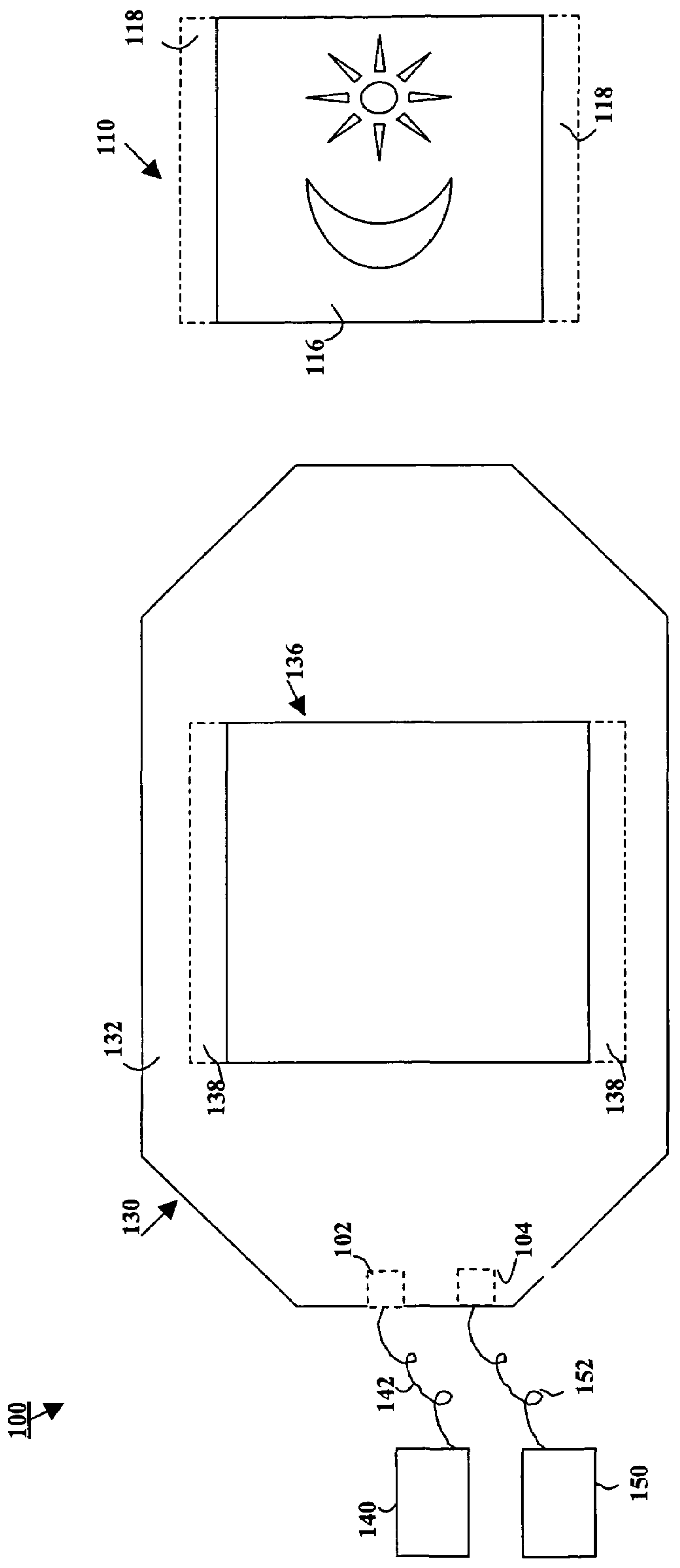
FIGS. 1B, 1C, and 1D show an example embodiment of how to interconnect the tray and a display monitor in accordance with the embodiment of FIG. 1A.
Figure 1D:
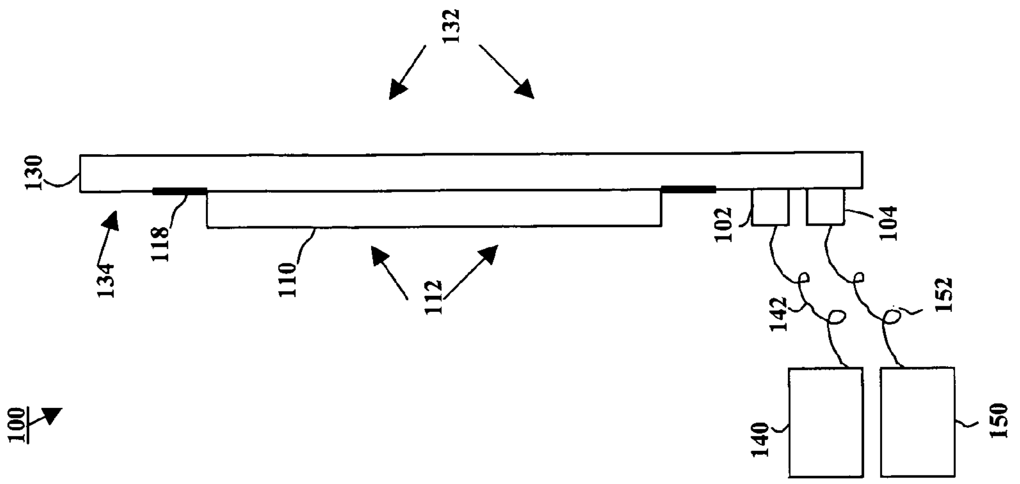
Figure 1C:
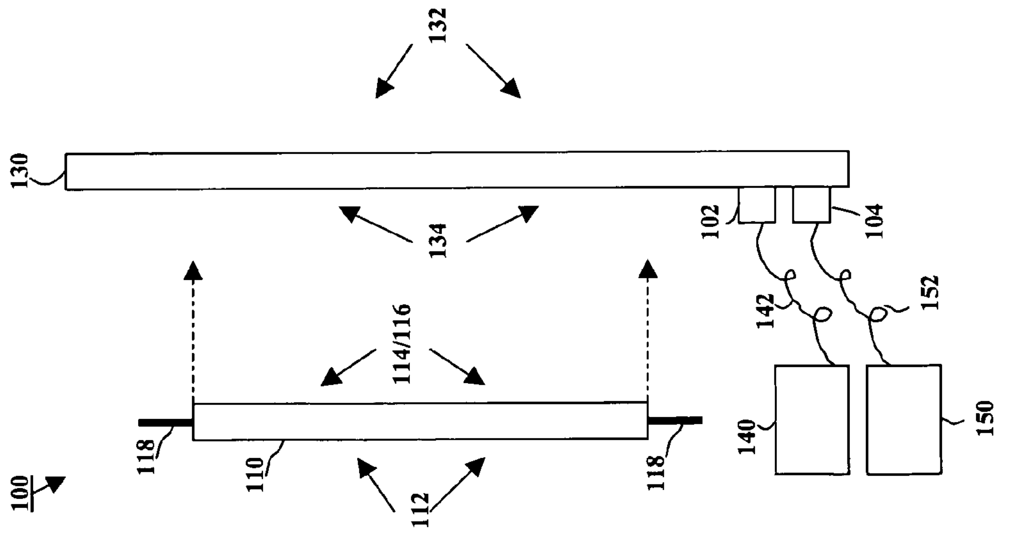
Figure 1E:
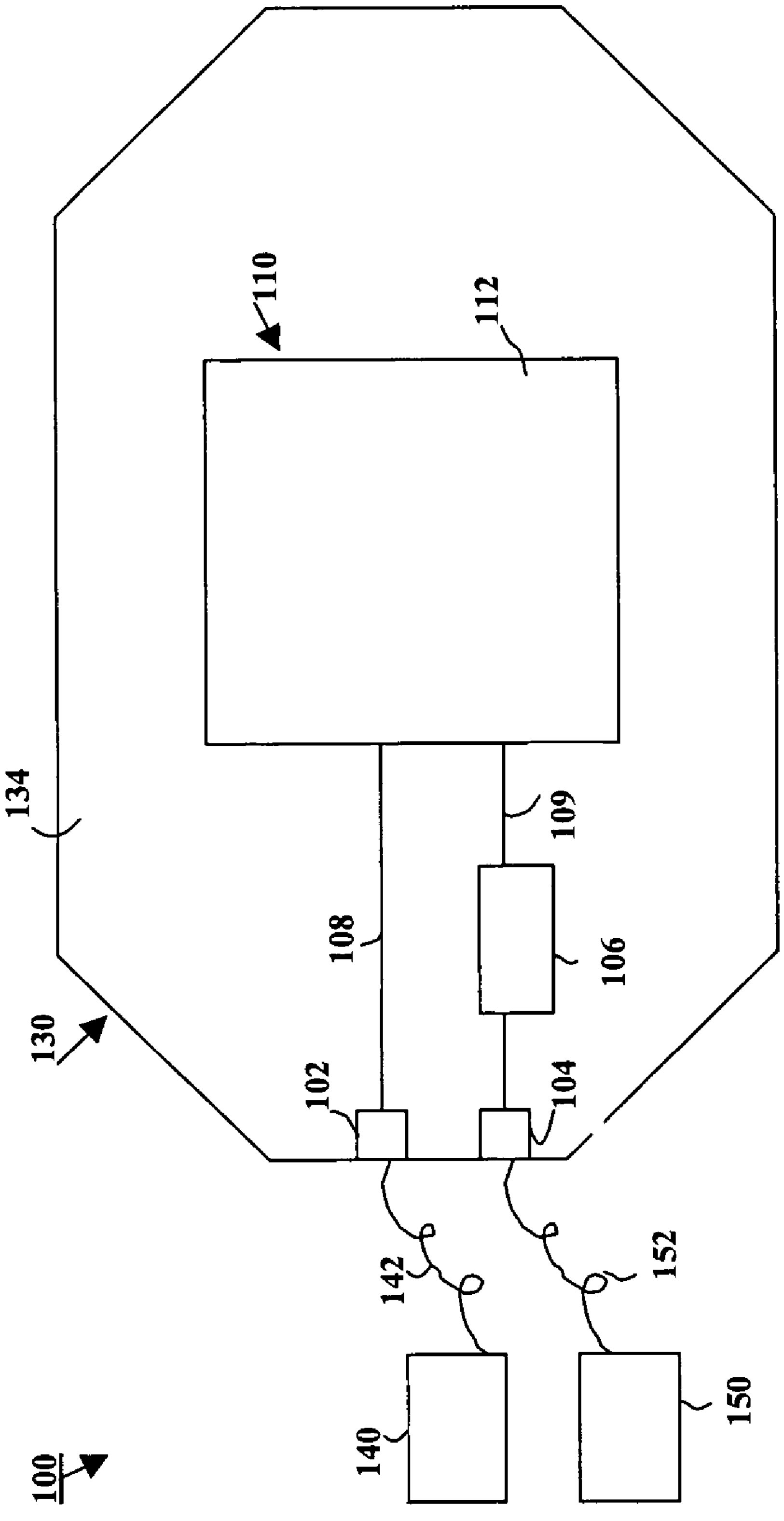
FIG. 1E shows a rear view of the tray and display monitor of FIG. 1A, and in particular, the interconnection of an external power source and information source to the display monitor.

FIGS. 1A-1E show another example of how this flush orientation can be achieved. In general, FIG. 1A shows a facial/front view of a system 100, with the display monitor 110 carried by the tray 130 in an integrated form, as the system would be used. FIG. 1B also shows a facial view of system 100 but with the display monitor 110 and tray 130 as separate components, prior to assembly. FIG. 1C shows a side view of system 100, again, with the display monitor 110 and tray 130 as separate components prior to assembly. FIG. 1D also shows a side view of system 100 but now with the display monitor 110 and tray 130 connected. FIG. 1E shows a rear or back view of system 100 with the display monitor 110 carried by the tray 130 in an integrated form In this example, the tray 130 includes an opening 136 that houses the display monitor 110. Although the opening 136 is shown in the Figures as being in the center of the tray, the exact location of the opening is not specific to the invention. As shown in FIG. 1A, the display monitor 110 is inserted into the opening 136 (as represented by the dotted line in FIG. 1A) and attached to the tray 130 so that the screen 116 is viewable from the front surface 132 of the tray and is flush with this front surface 132. As such, the size and shape of opening 136 is substantially the same size and shape as screen 116. In this orientation, the rear surface 112 of the monitor extends towards the rear surface 134 of the tray. In general, the attachment of the monitor to the tray can either be permanent or detachable, the latter arrangement allowing a user of the invention to remove the display monitor and more easily clean the tray, for example.

Overall, how the monitor and tray are attached in this example embodiment is not specific to the invention and those skilled in the art will readily recognize different ways without departing from the invention. Referring now to FIGS. 1B, 1C and 1D as a further example, however, the display monitor 110 can include a flange 118 attached to the perimeter of the monitor and extending outward so that it is substantially parallel to the monitor's front surface 114 and screen 116. For this example embodiment, the cross-dimensional size of opening 136 would be smaller than the cross dimensional size of the monitor and flange so that when the display monitor is superimposed over the opening 136, the flange 118 extends beyond the opening and overlaps an area 138 (as shown by the dotted line area in FIG. 1B). In this orientation, an epoxy glue, for example, can be applied to front surface 114 of the display monitor along the flange 118 and can also be applied to the rear surface 134 of the tray in area 138 and the monitor then fixably attached to the tray from the rear, as shown in FIGS. 1C and 1D. Similarly, rather than using an epoxy, several screws can be inserted through area 138 and the flange 118.

Alternatively, a complimentary interlocking mechanism, such as Velcro, can be used with one half of the mechanism being on front surface 114 of the display monitor along the flange 118 and the other half being on the rear surface 134 of the tray in area 138. In this way, the monitor can be detached from the back of the tray. Similarly, flexible tabs can be attached to the rear surface of the tray such that the tabs overlap the flange 118 to hold the display monitor in place and at the same time, can be flexed to release the monitor. Again, there are obviously many other ways to attach the display monitor and tray to achieve this substantially flush orientation without departing from the invention.

Figure 1F:
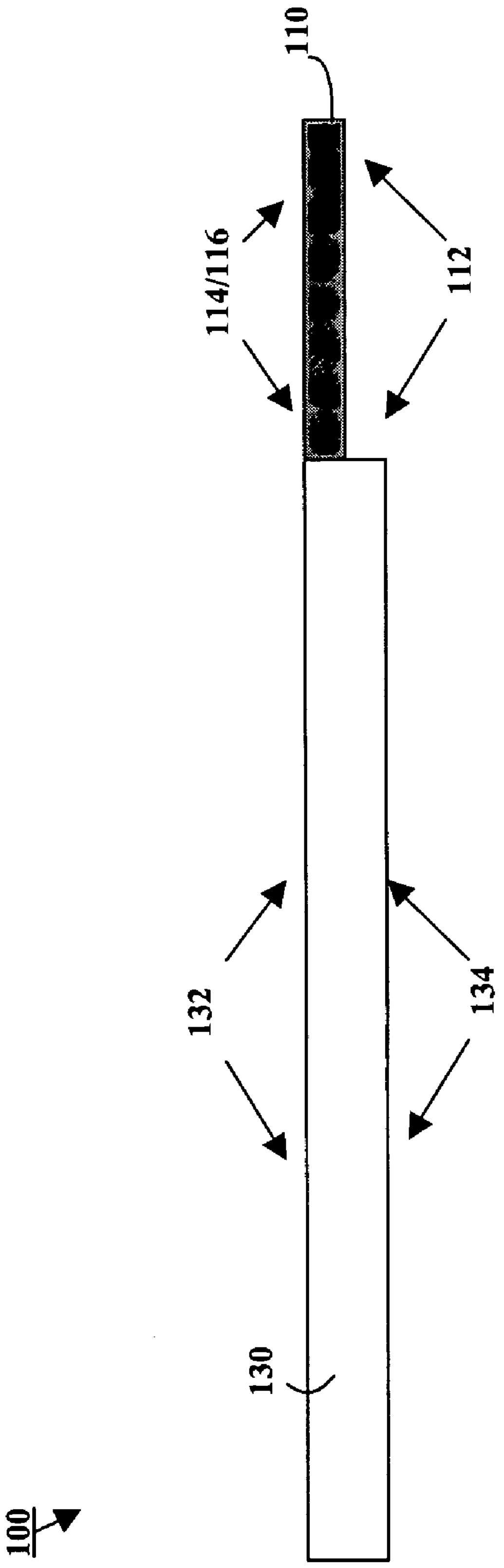
FIG. 1F shows a side view of a visual tray in accordance with an example embodiment of the invention where the display monitor screen is carried by the tray in an orientation adjacent to the tray front/serving surface.

Referring now to FIG. 1F, this figure shows a side view of the tray and display monitor, and shows a still further example of how this flush orientation can be achieved. Here, the display monitor 110 is attached to the edge of the tray 130 such that the screen 116 is flush with the tray front surface 132. In this example embodiment, the display monitor does not need to carry items to be carried, which can impede the view of the display monitor.

Overall, by making screen 116 flush with the tray front surface, the display monitor and screen essentially form part of the tray front surface. Accordingly, when system 100 is in use, items can be placed on the tray front surface such that the screen remains exposed. Items can also be placed over the screen 116 (e.g., the screen may have a protective clear covering such as plastic or glass). In this way, not only does the screen form part of the tray front service 132, it forms part of the actual serving face. In addition, while the examples above show the display monitor and screen as being smaller than the tray, nothing precludes the screen of the display monitor from being as large as the front surface 132 of the tray, again, with items being placed directly over the images, pictorial information, graphical information and/or video projected by the screen. In this way, the display monitor actually forms part of the tray 130 and in one aspect, can be considered the tray itself.

In an example embodiment, not shown, the display monitor 132 can be made moveable with respect to the front surface 132 by any of the known methods, e.g, can be made to pivot. In this way, the display monitor 132 can be adjusted to provide varying viewing angles.

Turning to the electronic information source 140 and the power source 150, the electronic information source provides the visual information that is displayed on screen 116. Electronic information source 140 can be any type of system that provides still or moving images/pictures, pictorial information, graphical information and/or video or the like. For example, information source 140 can be an MP4 player (e.g., the ARCHOS brand AV120 MP4 with a video out jack), a VHS player, a DVD player, a tuner (e.g., an electronic tuner for receiving a transmitted television station), a memory card, a video camera, etc. The information source 140 may also be a computer executing a program to produce an image/video. Alternatively, the computer can be connected to the Internet, through a wireless network, for example, and access web-based information for viewing. The power source 150 provides a source of power to display monitor 110. It can be, for example, a rechargeable 12V, 2300 mAh system from Dantona Industries, Inc., model no. CAM-322.

In accordance with the example embodiment of FIGS. 1A to 1F of the invention, the electronic information source 140 and the power source 150 need not be directly attached to the combination display monitor 110 and tray 130. Rather, these modules can be separate units that operatively interconnect to the display monitor through wires 142 and 152 and through the composite video input receptacle 102 and the power input receptacle 104, respectively. More specifically, the video-input receptacle 102 can be an information-input port for display monitor 110 and the power-input receptacle 104 can be a power-input port for the monitor. Although the particular location of the two receptacles is not specific to the invention, they can be located on the rear surface 134 of the tray, as shown in FIGS. 1C-1E (and as represented by the dotted boxes in FIGS. 1A-1B), towards the tray edge and be operatively connected to the display monitor 110 through connections 108 and 109. Note that electronic circuitry 106, known in the art, may be inserted between the power input receptacle 102 and the display monitor in order to convert the power levels provided by power source 150 to levels appropriate for the display monitor.

As such, the wire 152 is connected between the power source 150 and the power input receptacle 104, thereby providing power to the display monitor. Similarly, the wire 142 is connected between an output port of electronic information source 140 and the video input receptacle 102, thereby providing visual information to be displayed on screen 116.

Although not required, system 100 may also include protective coverings (not shown in the Figures). In particular, in order to protect the screen 116, a clear covering, such as plastic or glass, can be inserted across opening 136, for example, so that it covers the screen 116 (as was similarly described above). Similarly, the entire tray front surface 132 may be a clear covering with the screen 116 behind this covering. Similarly, in order to protect the rear surface 112 of the monitor and to protect the electronic circuitry 106, a cover can be attached on rear surface 134 of the tray over these components. In accordance with the invention, LEDs can also be dispersed on the front surface 132 of the tray in order to increase the visual attraction of the tray to onlookers. Here, the LEDs can be connected to the power-input receptacle 104 and thereby powered from power source 150.

As an example use of the example embodiment of FIGS. 1A to 1F of the invention, tray 130 may be a tray for serving hors d'oeuvres or drinks at a party. In this case, a waiter carrying the tray may carry the electronic information source 140 and the power source 150 on himself (for example, in a pouch connected to his belt). The wires 142/152 can run from these two units along the waiter's body and arm (his clothing concealing the wires from view) to the video-input receptacle 102 and to the power input receptacle 104. In this example, the inventive tray and display monitor provides the dual purpose of serving food to guests while also entertaining them. For example, the electronic information source 140 may provide images/video, for example, of a couple's wedding that occurred just minutes before, of a couple celebrating their anniversary, of a child's birthday, or of similar social type events. Similarly, the electronic information source 140 may provide marketing and advertising information so that as the waiter serves food to guests, merchants can simultaneously advertise to these guests.

As a further marketing example, the tray 130 can be used to carry and display products, such as cosmetics or small electrical devices like phones. At the same time, the display monitor can be showing, for example, visual information to enhance the presentation or even further describe the products.

However, the invention is applicable to many other applications. For example, the tray 130 may be the tray of a child's stroller or high chair, the electronic information source 140 playing the child's favorite video. In the case of the stroller, the person pushing the stroller may carry the electronic information source and the power source, or these units can be attached to the stroller. Similarly, in the case of the high chair, these units may be attached to the high chair. As another example, the tray 130 may be the tray of a wheel-chair, or a portable-eating tray that one might use to eat from while in bed, or similarly, a portable eating tray used in hospitals.

Reference will now be made to another example embodiment of the invention, examples of which are shown by the system 200 in FIGS. 2A, 2B, 2C, 2D, and 2E. In this example embodiment of the invention, the tray 130 carries the display monitor 110 such that the screen 116 is no longer flush or coplanar with the front surface 132 of the tray. Instead, the display monitor 110 is disposed on, or carried by, the front surface 132 so that the monitor 110 is substantially flush or substantially coplanar with the front surface 132 of the tray and forms part of the serving service of the tray.

Figure 2A:
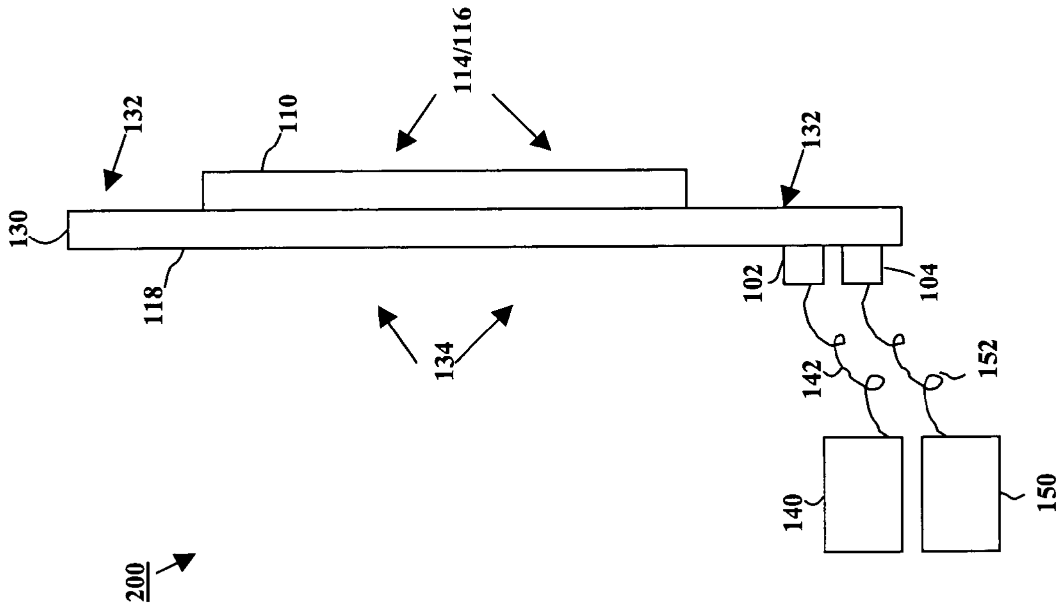
FIGS. 2A, 2B, 2C, 2D, and 2E show example embodiments of the visual tray in accordance with the present invention where a display monitor is now carried by the tray by being disposed on a front/serving surface of the tray or alternatively, is now adjacent to the tray front/serving surface.
Figure 2B:
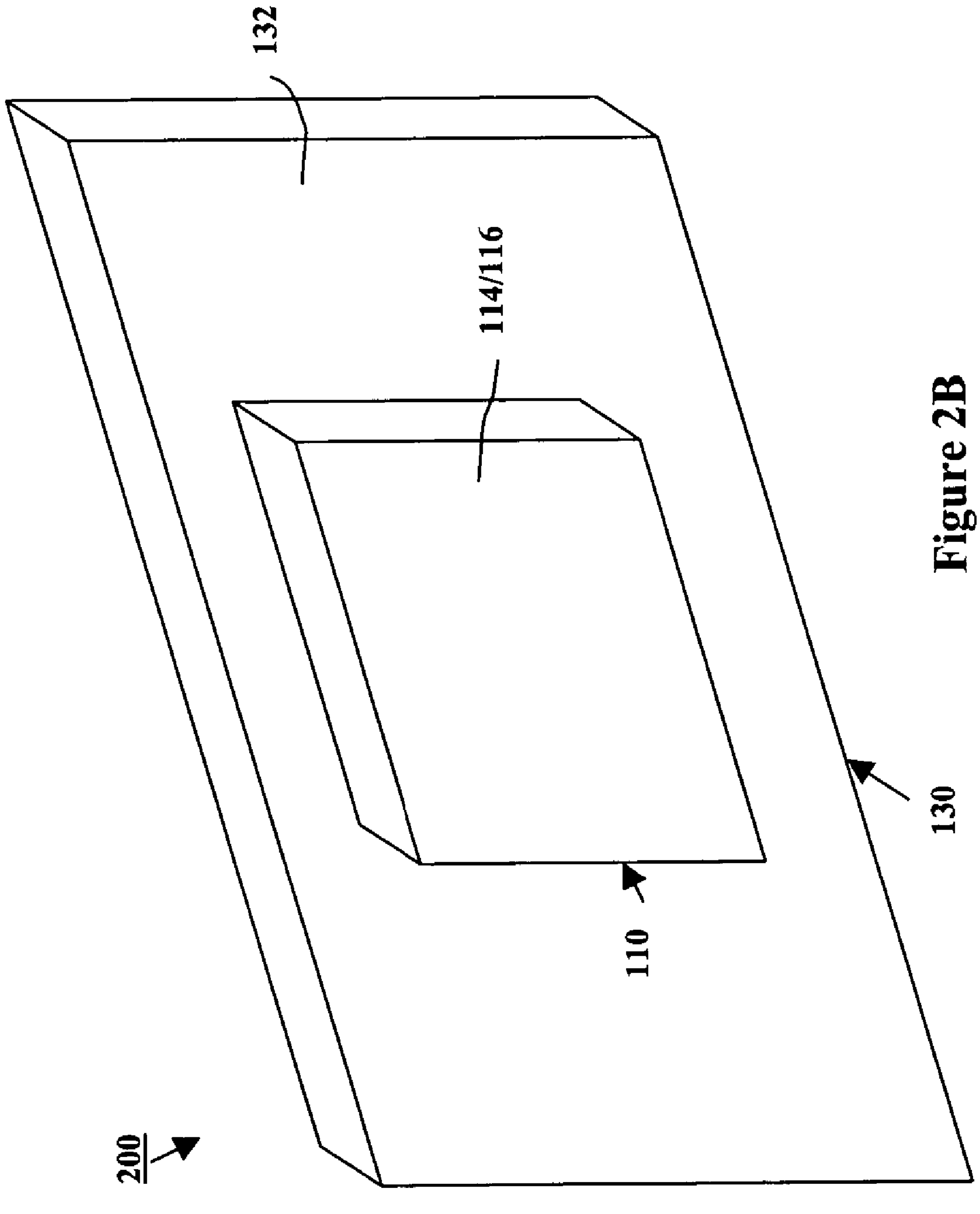

FIG. 2A (showing a side view) and FIG. 2B (showing an angular front view) show an example embodiment. Here, the display monitor 110 is disposed on, or carried by, the tray front surface 132 by, for example, simply attaching the display monitor rear surface 112 to the front surface 132 of the tray. As another example, the monitor can be disposed on the front surface by forming a depression from the rear of the tray such that it protrudes out the front surface 132. The display monitor can then be inserted into this depression such that the screen 116 is viewable from the front of the tray.

In both examples, the display monitor/screen are now essentially disposed on, or carried by, the front/serving surface 132 and in a plane parallel to and above the front surface 132, rather than being flush (of course, other ways of achieving this orientation are possible). In other words, the display monitor 110 is now substantially flush or substantially coplanar with the front surface 132. Of course, items could still be placed on the screen itself, similar to above, but now creating a tiered effect. It should be realized by those skilled in the art that even though in the aforementioned example embodiments the screen 116 and the front surface are shown to be parallel, the screen 116 need not be so oriented. For example, the screen 116 can be made to be substantially parallel to the front surface 132, it can be made to perpendicular or substantially perpendicular to the front surface 132, or at any transverse angle with respect to the front surface 132.

Figure 2C:
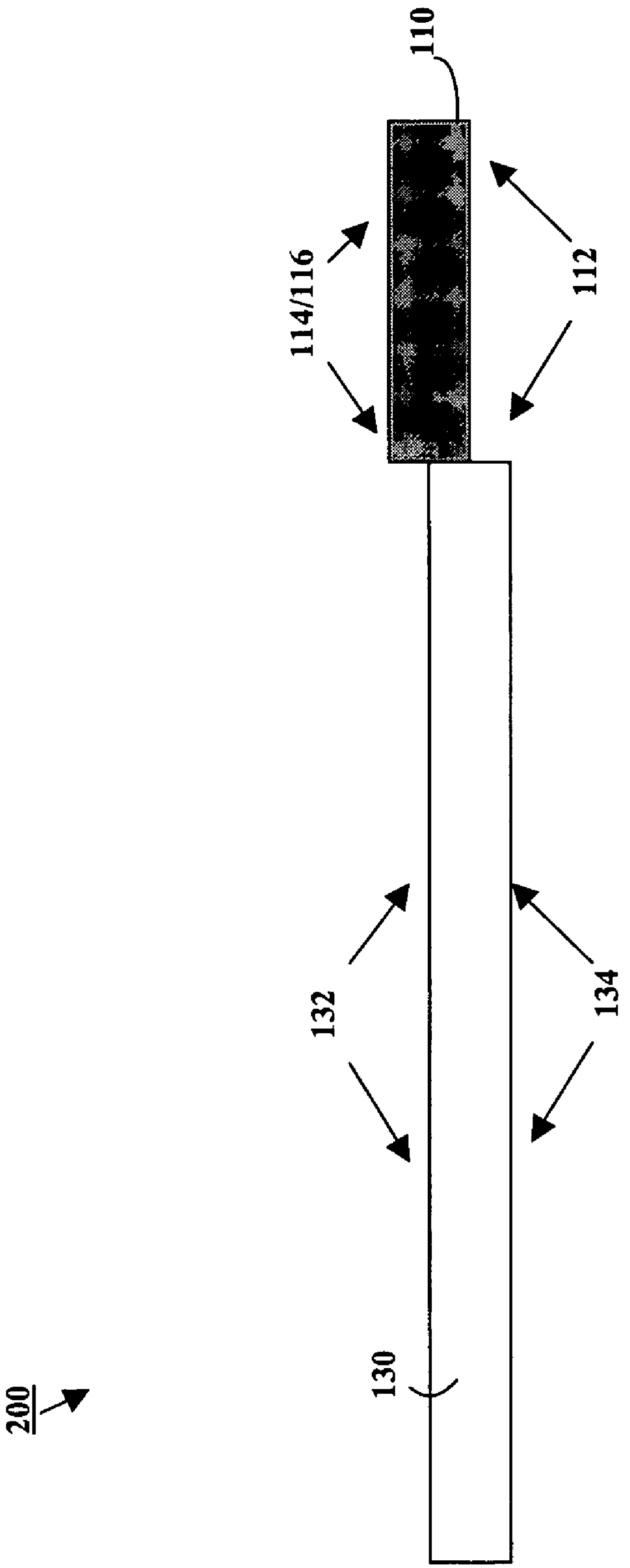

As indicated, in these two example orientations, the display monitor is essentially disposed on the front surface 132 of the tray. FIG. 2C (showing a side view of the tray and display monitor) shows a further example of this example embodiment. This example is similar to the example of FIG. 1F in that the display monitor 110 is attached to the edge of, or adjacent to, the front surface of the tray 130. In FIG. 2C, the screen 116 is in a different plane from the front surface 132 rather than being flush with the front surface 132.

Figure 2D:
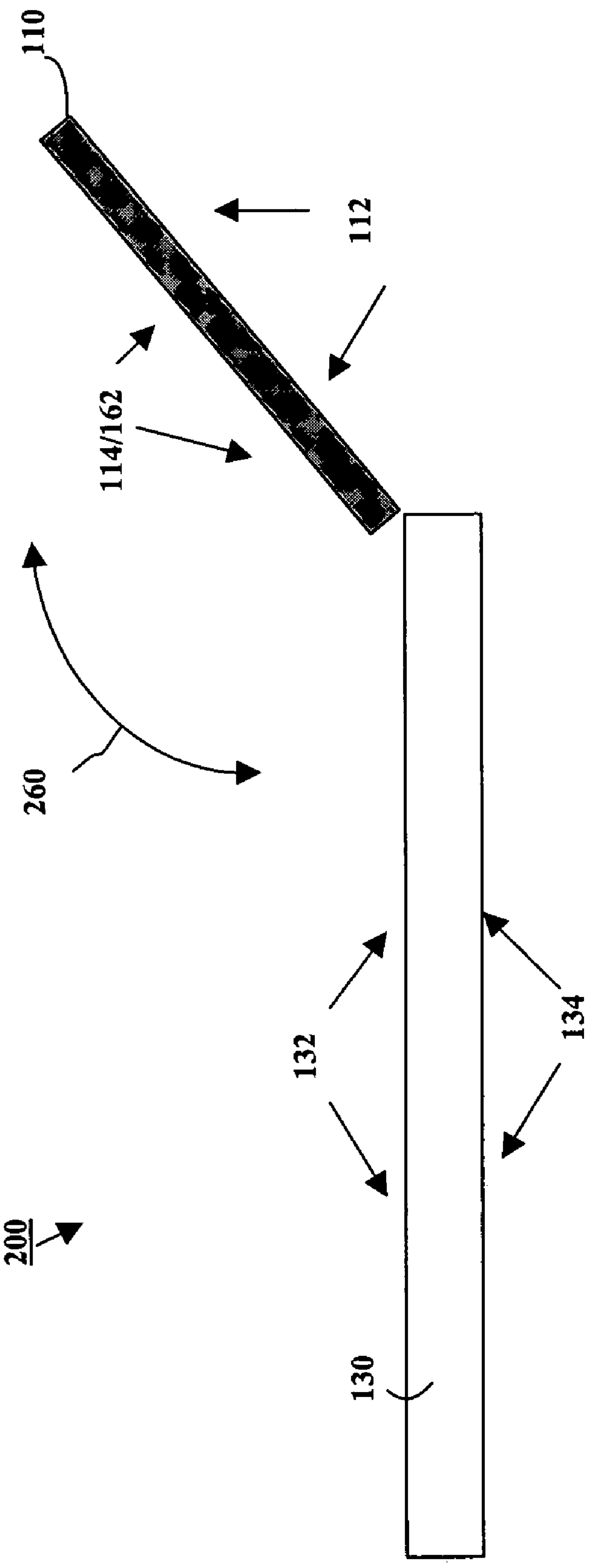

FIG. 2D shows a similar example. Here, however, the display monitor 110 is oriented at an angular or transverse orientation to the front surface 132 of the tray. It should be realized by those skilled in the art that while the display monitor in this example is shown as being attached to the edge of the tray, it may be attached at any point to the tray such that the screen 116 is viewable from the front surface of the tray. The display monitor 110 may also be attached in a stationary or movable orientation. For example, the display monitor 110 may be made to pivot, rotate or swivel, etc., with respect to the front surface 132 (e.g., as represented by the arrow 260 in FIG. 2D).

Figure 2E:
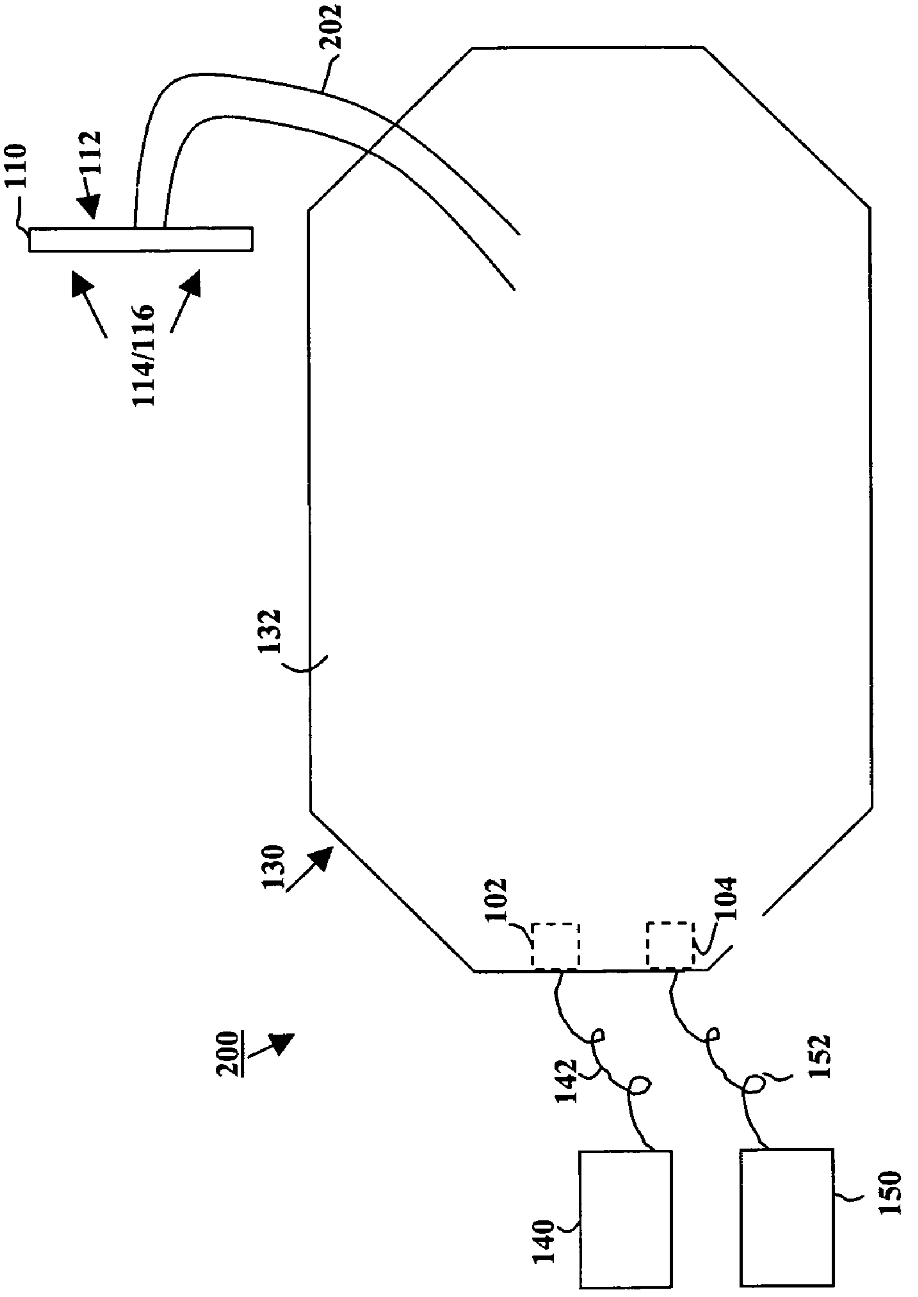

FIG. 2E shows still another example embodiment. Here, the display monitor 110 is attached to the tray 130 using an arm 202 such that the screen 116 is again raised from the tray front surface 132 and possibly at an angle to this surface. One end of the arm 202 is attached to the display monitor at the monitor's rear surface 112, for example, and the other end of the arm is attached to the tray front surface 132, for example. However, it is readily apparent that by using different length and shaped arms, the arm can also be attached to the rear surface 134 of the tray. In this example, the video input receptacle 118 and the power-input receptacle 110 may still be on the rear surface 134 of the tray.

Overall, in the examples of FIGS. 2C, 2D, and 2E of this example embodiment, the screen 116 is neither flush nor disposed on the front surface 132 of the tray. Rather, the display monitor and screen now essentially form part of the tray, and are not required to be part of the front serving surface 132.

Figure 3:
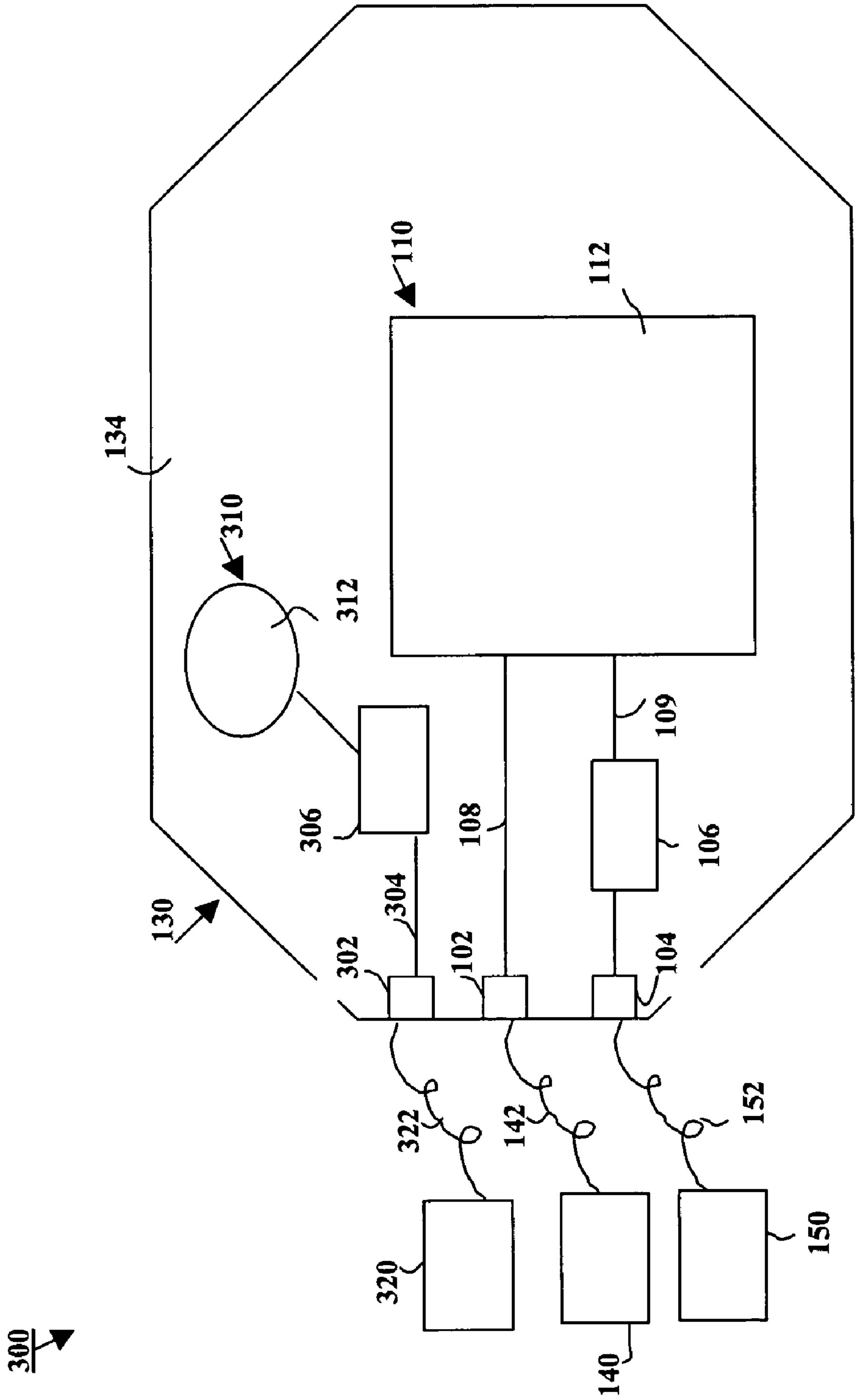
FIG. 3 shows a rear view of a visual tray in accordance with an example embodiment of the invention where at least one speaker is now integrated into the tray.

We refer now to FIG. 3, which shows another example embodiment 300 of the present invention. It should be noted that while this example uses flush-mount screens as described above, this example embodiment need not be so limited as also described above.

System 300 is similar to the previous embodiments but now further includes an audio input receptacle 302 and at least one speaker 310 for projecting audio to a person near the tray, both the receptacle 302 and the speaker 310 being attached to. the tray. The location of speaker 310 on the tray 130 and how the speaker is attached to the tray, however, is not specific to the invention. For example, assuming the speaker 310 essentially has a rear surface and an opposing surface, 312, for projecting audio, the rear surface of the speaker can be attached to the rear surface 134 of the tray 130 such that speaker projecting-surface 312 projects audio downward. This example embodiment is shown in FIG. 3. Similarly, the rear surface of the speaker can be attached to the front surface 132 of the tray 130 such that the speaker projecting-surface 312 projects audio upward. As a further example, the projecting surface 312 of the speaker can be attached to the rear surface 134 of the tray and project audio upward. In this latter case, the area of the tray directly covering the speaker front surface 312 may have a plurality of small openings for allowing the audio waves to pass through the tray.

The audio input receptacle 302 is an audio input port for the speaker 310 and is connected to the speaker through a wire 304. Although not required, a volume control unit 306, as is readily known in the art, may be attached to the tray and operatively connected between the audio input receptacle 302 and speaker 310 for adjusting the speaker volume. The audio input receptacle 302 can be mounted, for example, on the rear surface 134 of the tray and in general, can be co-located with the video input receptacle 102 and the power input receptacle 104.

In accordance with this embodiment, an audio information source 320 is also required for providing audio output to the speaker 310. Similar to the electronic information source 140 and the power source 150, the audio information source 320 is separate from the display monitor 110 and tray 130 and is connected to the audio input receptacle 302 through a wire 322. The audio information source 320 may be a tape player, a CD player, an AM/FM tuner, etc. Audio information source 320 may, however, also be the same system as the electronic information source 140.

Figure 4A:
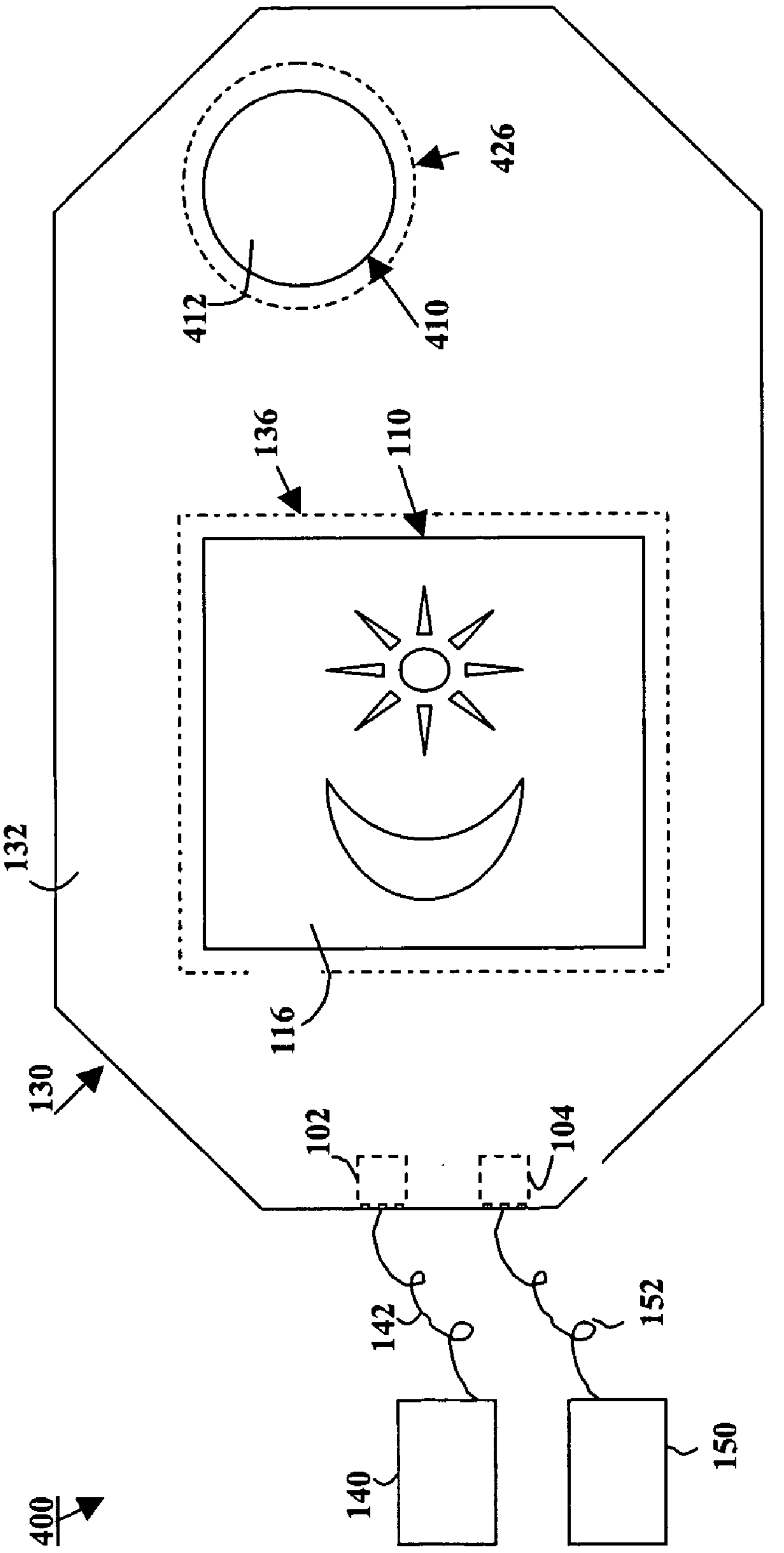
FIGS. 4A and 4B show visual trays in accordance with an example embodiment of the invention, the trays including a display monitor and a camera where an image on the display monitor can be switched between the camera and another source.
Figure 4B:
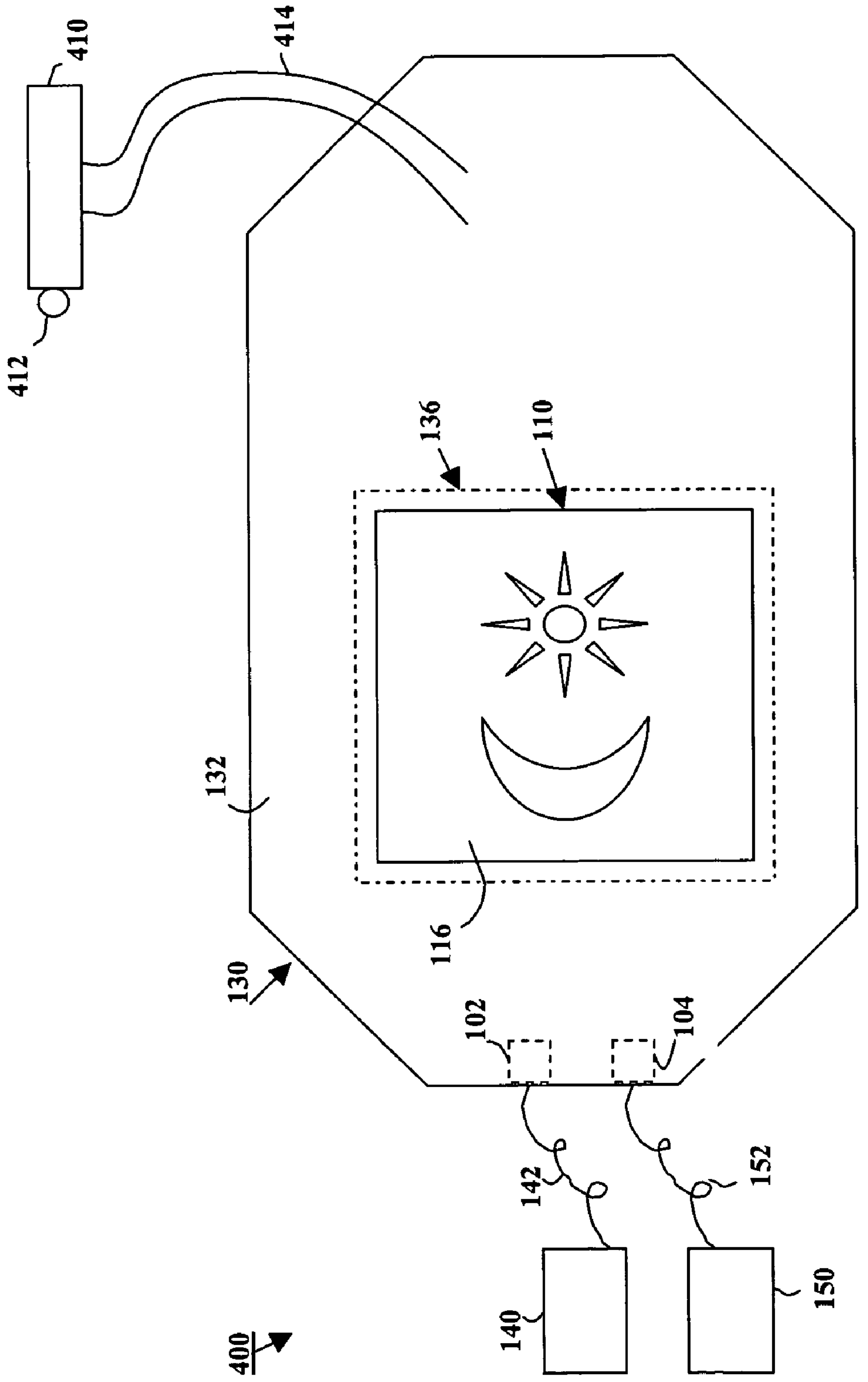
Figure 4C:
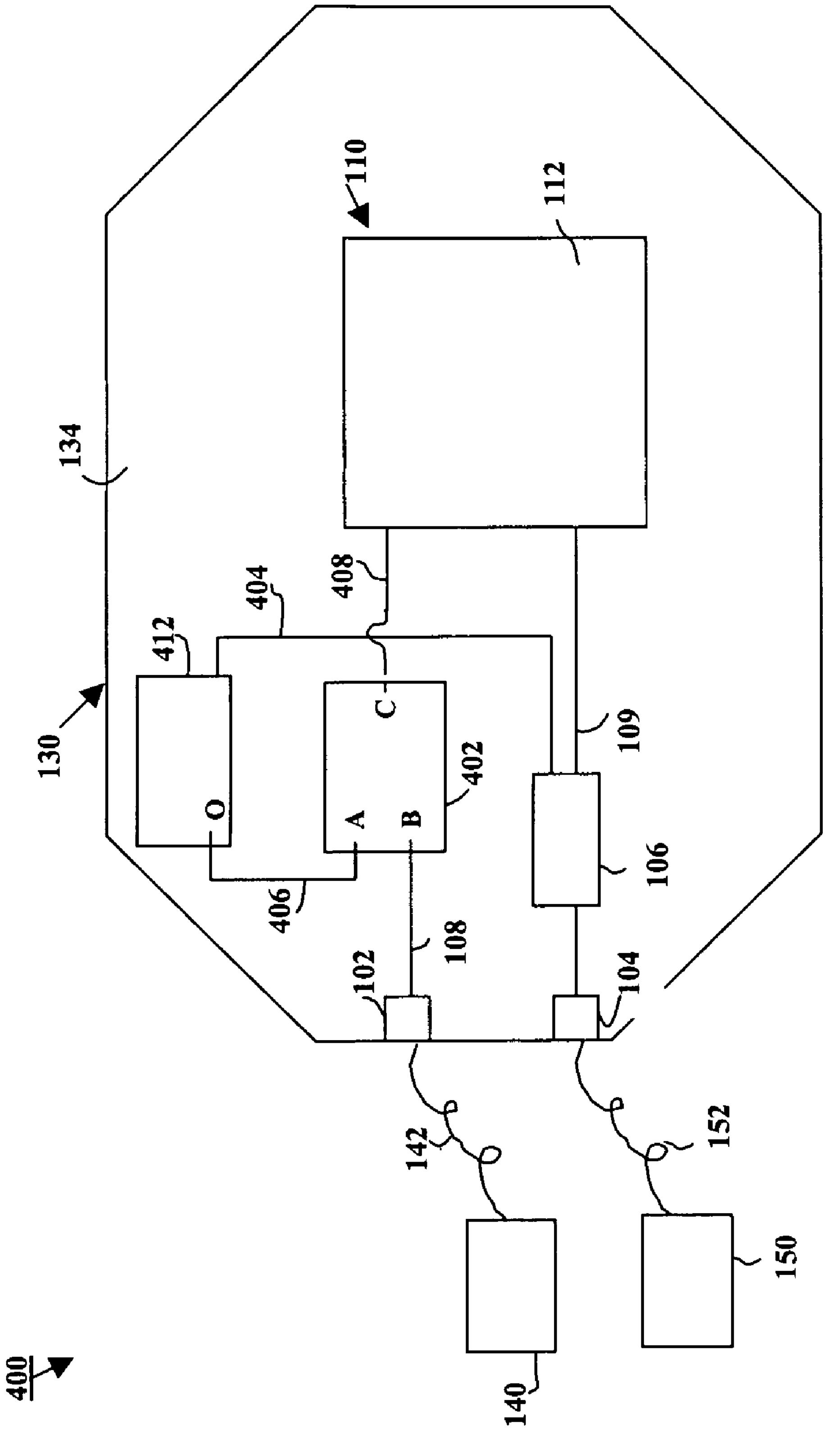
FIG. 4C shows a rear view of a combination tray and display monitor of the embodiment of FIGS. 4A and 4B, and in particular, the interconnections to achieve switchable images.

FIGS. 4A, 4B, and 4C now refer to another example embodiment of the invention 400. Again, while this example embodiment will be described as a variation of the example embodiment of FIGS. 1A-1F, it is also applicable to the other embodiments described above. System 400 is similar to the above example embodiments but now further includes a video camera 410 with a lens 412 for capturing the image/video of those people and objects, etc. that are near the tray and within the camera's field of view. The video camera 410 can be of the type available from any of the know suppliers. In an example embodiment, the video camera 410 is of a small size.

System 400 may also include a switch 402, or be any type of switching device available from any of the known suppliers. Both the switch and the camera are mounted to the tray 130 and form part of the tray. In accordance with this example embodiment of the invention, when only a camera is provided, the display monitor 130 displays information provided by the camera 410. When a switch is also included, the display monitor 130 displays information provided either by the electronic information source 140 or by the camera 410 depending upon the setting of switch 402 as configured by a person in close proximity to the tray.

In general, the camera 410 is directly attached to tray 130 such that the lens 412 will substantially capture images, pictorial information, graphical information, and/or video of people/objects as seen from the perspective of the tray front surface 132. The specifics of how and where camera 410 is specifically attached to the tray is not particular to the invention. For example, as shown in FIG. 4A, tray 130 can include a second opening 426 (as represented by the dotted line) and the camera 410 can be inserted into this opening such that the lens 412 captures images, pictorial information, graphical information, and/or video substantially in front of the tray. Again, the camera can be mounted to the tray using similar techniques as described for the display monitor of the example embodiments described above. In addition, the camera may either be in a fixed position in a position that can be rotated and swiveled.

FIG. 4B shows another example embodiment 400. Here, the camera 410 is attached to the tray 130 using a pivoting arm 414 such that one end of the arm is attached to the camera 410 and the other end of the arm is attached to the tray front surface 132, for example. However, as is readily apparent, by using different length and shaped arms, the arm can also be attached to the rear surface 134 of the tray.

In a still a further example embodiment, the camera can be co-located with the display monitor. For example, in FIG. 2D, the camera can be attached to the side of the display monitor.

As indicated, the camera 410 may either be directly connected to the display monitor or connected through a switch or any type of switching device available from any of the known suppliers. The switch interconnections between the camera 410 and the display monitor 110 are shown in FIG. 4C, which shows the rear surface 134 of the tray. As seen, the camera 412 is powered using the power source 150. Accordingly, the power input receptacle 104 is connected to both the display monitor 110 through wire 109 and to the camera 412 through wire 404 (again, the device 400 may include electronic circuitry, represented here by module 106, to convert power levels between the power source and camera). As indicated, the switch 402 is used to determine whether the display monitor displays the information the camera captures, or displays the information the electronic information source 140 provides. As such, the switch includes two input connectors, 402-A and 402-B, and one output connector 402-C and can toggle between connecting either input (A or B) to the output (C). The video-input receptacle 102 now connects to connector 402-B through wire 108 and an output port 412-O of camera 410 connects to connector 402-A through wire 406. The output connector 402-C of the switch in turn connects to the display monitor through wire 408. In this way, the switch operatively toggles between the camera 410 and electronic information source 140.

Note that as described with reference to other embodiments described above, device 400 may also include one or more speakers.

Reference will now be to another example embodiment of the invention, which embodiment is similar to the above embodiments but now includes a second display monitor, or any other number of display monitors. As such, in accordance with this embodiment of the invention, two or more different images, pictorial information, graphical information, and/or video can be simultaneously displayed.

Figure 5:
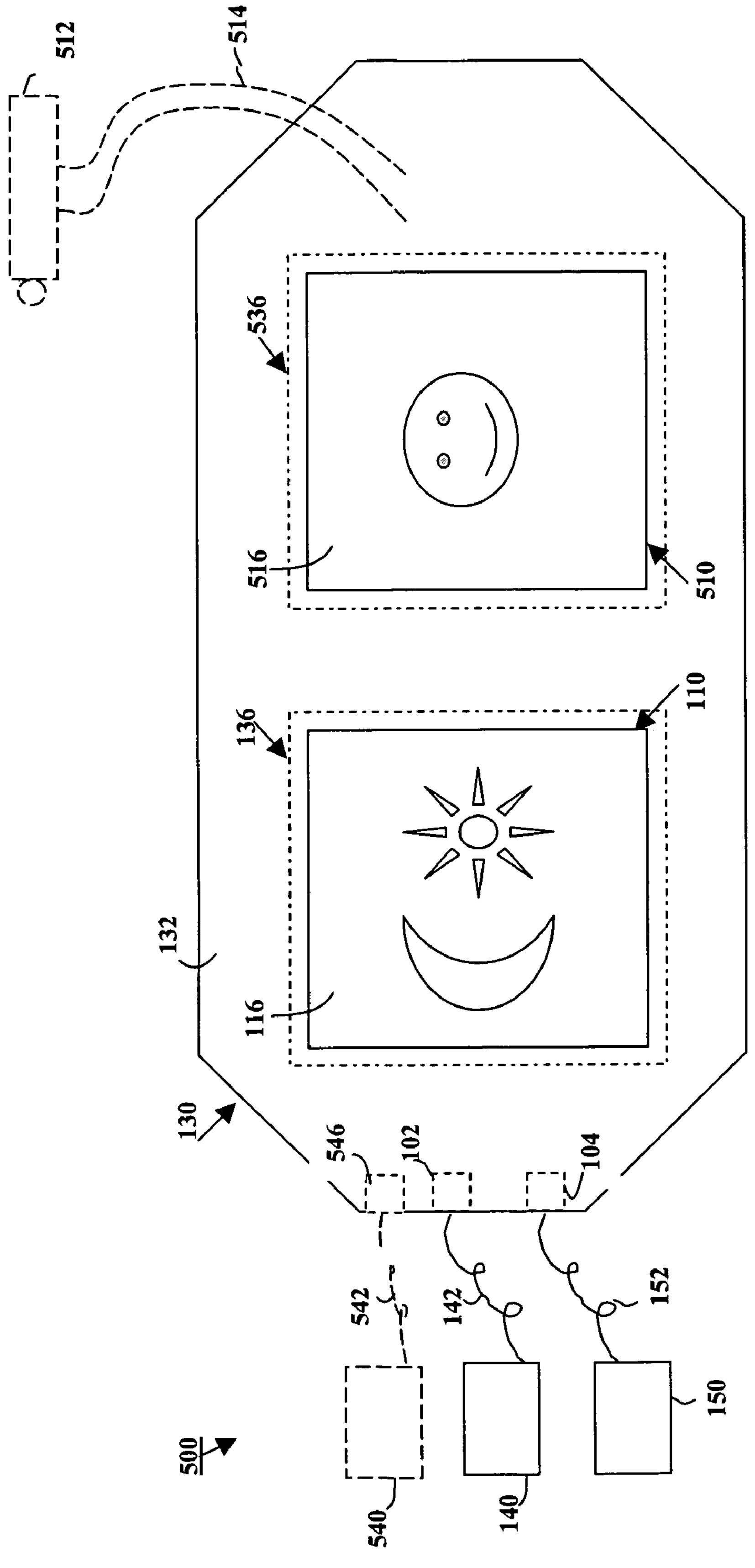
FIG. 5 shows a visual tray in accordance with an example embodiment of the invention, the tray now including multiple display monitors.

FIG. 5 shows an example system 500 in accordance with this example embodiment. As seen in this example, the tray 130 now includes a second opening 536 (as represented by the dotted line) in which a second display monitor 510, with a screen 516, is inserted flush with tray front surface 132 and is attached to tray 130 as similarly described for system 100. Other variations are possible. For example, display monitor 516 can be attached as was described for the aforementioned embodiment such that it is raised with respect to the tray front surface or attached to the tray through an arm, etc. Similarly, both display monitors 110 and 510 can be attached in a raised fashion, as was described for the aforementioned embodiment.

In this example embodiment, both the display monitors 110 and 510 are powered from power source 150. As such, the power receptacle 104 is connected to both monitors (again, with the appropriate power conversion circuitry).

As for the information source providing information to the second display monitor 510, this also can vary. For example, as shown in the example system 500, a camera 512 (as represented by the dotted image), similar to that described in the aforementioned embodiment, can be attached to the tray 130. Here, camera 512 would be powered by power source 150 and connected to the tray 130 through an arm 514, for example. In this configuration, electronic information source 140 would connect through wire 142 to video input receptacle 102 and provide display information solely to display monitor 110. The output of camera 512, in turn, would connect solely to display monitor 510 (i.e. there is no switching in this variation as was described in the aforementioned embodiment).

As another example embodiment, rather than include camera 512, a second electronic information source 540 (as represented by the dotted image) and a second video-input receptacle 546 can be added to the system. In this configuration, electronic information source 140 would connect through wire 142 to video input receptacle 102 and provide display information solely to display monitor 110. Similarly, electronic information source 540 would connect through wire 542 to video-input receptacle 546 and provide display information solely to display monitor 510, Of course, it will be readily apparent to those skilled in the art that many other variations are possible without deviating from the invention. For example, the system can include both the second electronic information source 540 and the camera 512, where the camera is now switched between one of these sources, as was similarly described for the aforementioned embodiment. Similarly, more than two display monitors can be used.

Figure 6:
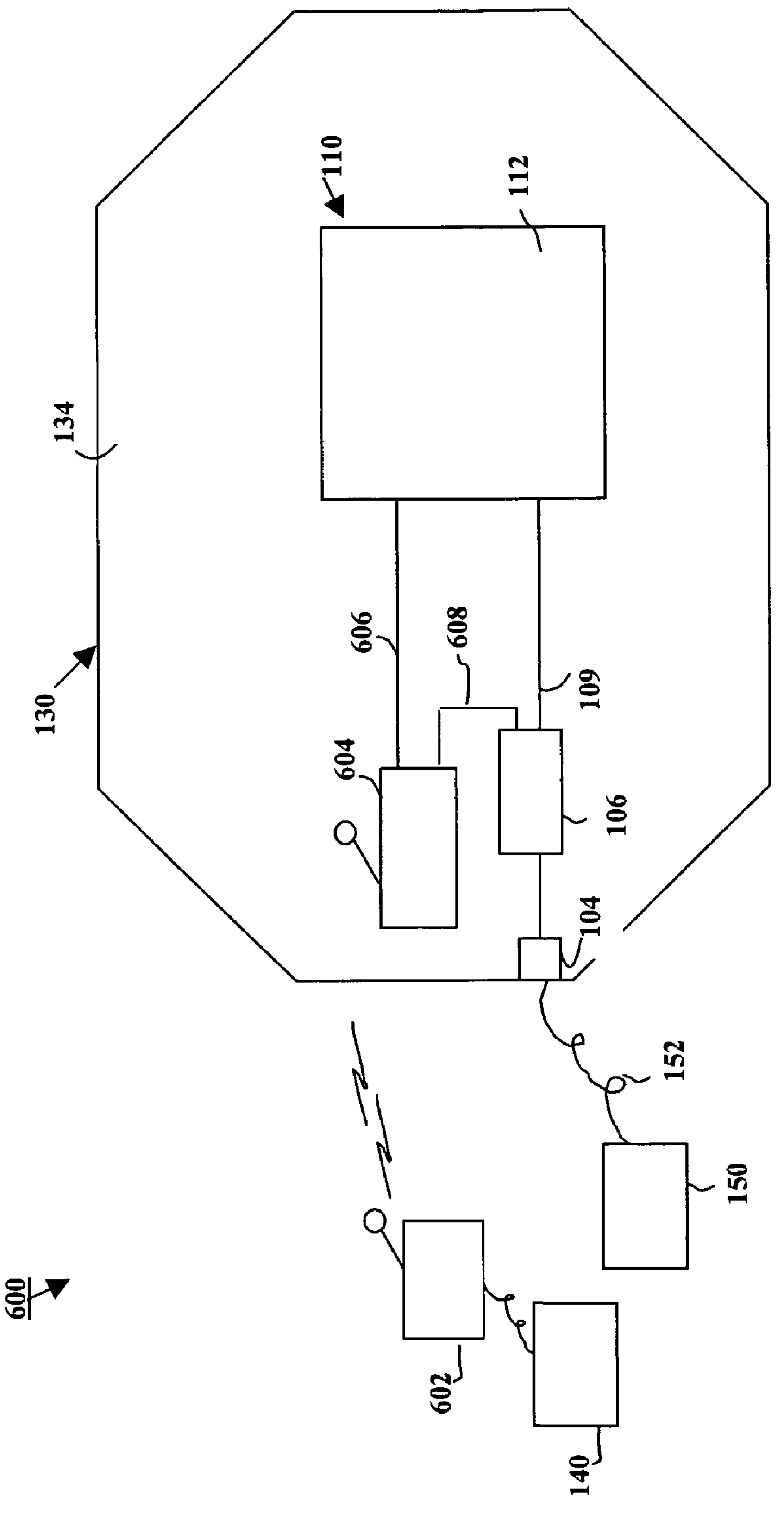
FIG. 6 shows a visual tray in accordance with the embodiments of FIGS. 1-5 where information displayed by a monitor is now received wirelessly.

Reference will now be made to another example embodiment of the invention. As described with reference to the aforementioned embodiments, the electronic information source 150 (and similarly the audio information source 302) can be connected to the display monitor 110 through a wire 142 and video input receptacle 102. As an alternative to using this wire connection, the visual information provided by the electronic information source 150 can be wirelessly transmitted to the display monitor. FIG. 6 shows an example system 600 in accordance with this embodiment, the tray 130 being shown from its rear surface 134. Again, while this embodiment will be described as a variation of this example embodiment, it is also applicable to the other embodiments.

In system 600, a wireless transmitter 602 and a wireless receiver 604 replace the wire 142 and the video input receptacle 102 of system 100. In particular, wireless transmitter 602 is co-located with and connected to the output of the electronic information source 140 and transmits over a wireless medium the signal produced by electronic information source 140. Similarly, the wireless receiver 604 is attached to the tray 130 and is operatively connected to the display monitor 110 through connection 606. The receiver 604 is powered by the power source 150 and as such, is connected to the power receptacle 104 through connection 608. In this arrangement, visual information is transmitted by electronic information source 140 through transmitter 602. This information is received by receiver 604 and conveyed to display monitor 110 for viewing. Note that the design of a wireless transmitter 602 and a wireless receiver 604 for transmitting and receiving information (audio and visual) over short or long distances, is readily known in the art (e.g., baby monitors, such as products by Avtech Solutions, Inc., will wirelessly transmit and receive both audio and video signals).

Reference will now be made to another example embodiment of the invention. In the above embodiments, the electronic information source 140 and power source 150 where indicated as being separate modules from the combination display monitor 110 and tray 130. In accordance with this example embodiment, the electronic information source 140 and power source 150 are integrated with and connected to the combination display monitor and tray. Of course, it will be readily apparent to those skilled in the art that in this configuration, the display monitor, electronic information source, and power source may be separate units all interconnected with the tray, may be a single composite unit integrated with the tray, or be some variation thereof. Note further that because of the integrated orientation of this embodiment, the video input receptacle 102 and the power input receptacle 104 may not be needed Although the present invention has been described in relation to particular embodiments thereof, many other variations, modifications, and other uses will become apparent to those skilled in the art. It is preferred, therefore, that the present invention not be limited by the specific disclosure herein.

What I claim is:

1. A portable device, comprising:

a tray, the tray including at least one serving face in which at least a substantial part of the at least one serving face is constructed and arranged to hold at least one item to be carried;

at least one display monitor carried by the tray such that the monitor is substantially viewable together with the at least one serving face of the tray; and an interface operably connected to the display monitor and intended to be operably connected to a source such that at least one selected from the group consisting of video, a series of images, a series of pictorial information, and a series of graphical information can be displayed on the at least one display monitor, wherein the at least substantial part of the at least one serving face is constructed and arranged to hold at least one item selected from the group consisting of a food item and a liquid item.

2. The device of claim 1, wherein the at least one display monitor is carried by the tray such that the monitor is substantially flush with the at least one serving face of the tray.

3. The device of claim 1, wherein the at least one display monitor is carried by the tray such that the monitor is disposed on the at least one serving face of the tray.

4. The device of claim 1, wherein the at least one display monitor is carried by the tray such that the monitor forms part of the at least one serving face of the tray.

5. The device of claim 1, wherein the tray is at least one selected from the group consisting of an hors d'oeuvre tray, a high chair tray, a wheel-chair tray, and a stroller tray.

6. The device of claim 1, wherein the at least one selected from the group consisting of video, a series of images, a series of pictorial information, and a series of graphical information are marketing information.

7. The device of claim 1, wherein the at least one selected from the group consisting of video, a series of images, a series of pictorial information, and a series of graphical information are of a social event.

8. The device of claim 1, wherein the at least one selected from the group consisting of video, a series of images, a series of pictorial information, and a series of graphical information are web-based information.

9. The device of claim 1, wherein the source is a computer interfaced to the Internet.

10. The device of claim 1, wherein the interface is a wireless access interface.

11. The device of claim 1, further comprising an audio device to output audio information.

12. The device of claim 11, wherein the audio device is at least one loudspeaker.

13. The device of claim 1, further comprising a camera carried by the tray to display camera images on the at least one display monitor.

14. The device of claim 1, wherein the at least one display monitor is moveable with respect to the at least one serving face.

15. The device of claim 1, wherein the at least one display monitor is oriented transversely to the at least one serving face.

16. The device of claim 15, wherein the at least one display monitor is oriented substantially perpendicular to the at least one serving face.

17. The device of claim 1, wherein the at least one display monitor is oriented substantially parallel to the at least one serving face.

18. The portable device of claim 1, wherein at least a portion of the at least one display monitor is protected from the at least one item selected from the group consisting of a food item and a liquid item.

19. A portable device, comprising:
- a tray, the tray including at least one serving face in which at least a substantial part of the at least one serving face is constructed and arranged to hold at least one item to be carried;
- at least one display monitor carried by the tray such that the monitor is substantially viewable together with the at least one serving face of the tray;
- an interface operably connected to the display monitor and intended to be operably connected to a source such that at least one selected from the group consisting of images, pictorial information, graphical information and video can be displayed on the at least one display monitor;
- a camera carried by the tray to display camera images on the at least one display monitor; and
- a switch with at least first and second inputs and at least one output and being operable to connect either the at least first or second inputs to the at least one output, wherein the output of the camera is connected to the first switch input, said interface is connected to the second switch input, and the switch output is connected to the at least one display monitor.

20. A portable device, comprising:
- a tray, the tray including at least one serving face in which at least a substantial part of the at least one serving face is constructed and arranged to hold at least one item to be carried;
- at least one display monitor carded by the tray such that the monitor is substantially viewable together with the at least one serving face of the tray;
- an interface operably connected to the display monitor and intended to be operably connected to a source such that at least one selected from the group consisting of video, a series of images, a series of pictorial information, and a series of graphical information can be displayed on the at least one display monitor; and
- a second display monitor intended to be operably connected to at least one selected from the group consisting of the source and a second source, such that at least one selected from the group consisting of images, pictorial information, graphical information and video can be displayed on the second monitor.

21. The device of claim 20, wherein the second source is a camera that is carried by the tray.

22. A portable device, comprising:
- a tray, the tray including at least one serving face in which at least a substantial part of the at least one serving face is constructed and arranged to hold at least one item to be carried;
- at least one display monitor carried by the tray and substantially viewable together with the at least one serving face of the tray, the at least one serving face and the at least one display monitor being constructed and arranged so that they are substantially coplanar; and
- an interface operably connected to the display monitor and intended to be operably connected to a source such that at least one selected from the group consisting of video, a series of images, a series of pictorial information, and a series of graphical information can be displayed on the at least one display monitor, wherein the at least substantial part of the at least one serving face is constructed and arranged to hold at least one item selected from the group consisting of a food item and a liquid item.

23. The device of claim 22, wherein the at least one display monitor is moveable with respect to the at least one serving face.

24. The portable device of claim 22, wherein at least a portion of the at least one display monitor is protected from the at least one item selected from the group consisting of a food item and a liquid item.

25. A portable device, comprising:
- a tray, the tray including at least one serving face in which at least a substantial part of the at least one serving face is constructed and arranged to hold at least one item to be carried;
- the at least one serving face including at least one display monitor; and
- an interface operably connected to the display monitor and intended to be operably connected to a source such that at least one selected from the group consisting of video, a series of images, a series of pictorial information, and a series of graphical information can be displayed on the at least one display monitor, wherein the at least substantial part of the at least one serving face is constructed and arranged to hold at least one item selected from the group consisting of a food item and a liquid item.

26. The portable device of claim 25, wherein at least a portion of the at least one display monitor is protected from the at least one item selected from the group consisting of a food item and a liquid item.

27. A portable device, comprising:
- a tray, the tray including at least one serving face in which at least a substantial part of the at least one serving face is constructed and arranged to hold at least one item to be carried;
- at least one display monitor carried by the tray such that the monitor is substantially viewable together with the at least one serving face of the tray; and
- a source operably connected to the display monitor such that at least one selected from the group consisting of video, a series of images, a series of pictorial information, and a series of graphical information can be displayed on the monitor, wherein the at least substantial part of the at least one serving face is constructed and arranged to hold at least one item selected from the group consisting of a food item and a liquid item.

28. The portable device of claim 27, wherein at least a portion of the at least one display monitor is protected from the at least one item selected from the group consisting of a food item and a liquid item.

29. A method for presenting items, comprising the steps of:
- carrying a tray, the tray including at least one serving face in which at least a substantial part of the at least one serving face is constructed and arranged to hold at least one item to be carried; and
- displaying at least one selected from the group consisting video, a series of images, a series of pictorial information, and a series of graphical information on at least one display monitor carried by the tray such that the monitor is substantially viewable together with the at least one serving face of the tray, wherein the at least substantial part of the at least one serving face is constructed and arranged to hold at least one item selected from the group consisting of a food item and a liquid item.

30. The method of claim 29, further comprising the step of:

interfacing the at least one display monitor with a source to display the at least one selected from the group consisting video, a series of images, a series of pictorial information, and a series of graphical information on the monitor.

31. The method of claim 30, wherein the source is a camera carried by the tray.

32. The method of claim 29, wherein at least a portion of the at least one display monitor is protected from the at least one item selected from the group consisting of a food item and a liquid item.

33. A portable device, comprising:

means for carrying at least one item on at least one serving face constructed and arranged to hold at least one item to be carried; and means for substantially viewing together the at least one serving face and at least one selected from the group consisting video, a series of images, a series of pictorial information, and a series of graphical information, wherein the at least one serving face is constructed and arranged to hold at least one item selected from the group consisting of a food item and a liquid item.

34. The portable device of claim 33, wherein at least a portion of the viewing means is protected from the at least one item selected from the group consisting of a food item and a liquid item.

* * * * *